United States Patent
Koo et al.

(10) Patent No.: US 8,583,930 B2
(45) Date of Patent: Nov. 12, 2013

(54) DOWNLOADABLE CONDITIONAL ACCESS SYSTEM, SECURE MICRO, AND TRANSPORT PROCESSOR, AND SECURITY AUTHENTICATION METHOD USING THE SAME

(75) Inventors: Han-seung Koo, Daejeon-si (KR); Eun-jung Kwon, Daejeon-si (KR); Soon-choul Kim, Daejeon-si (KR); Hee-jeong Kim, Daejeon-si (KR); Young-ho Jeong, Daejeon-si (KR); O-hyung Kwon, Daejeon-si (KR); Soo-in Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 629 days.

(21) Appl. No.: 12/724,988

(22) Filed: Mar. 16, 2010

(65) Prior Publication Data

US 2010/0241858 A1    Sep. 23, 2010

(30) Foreign Application Priority Data

Mar. 17, 2009 (KR) .................. 10-2009-0022799
Sep. 21, 2009 (KR) .................. 10-2009-0089104

(51) Int. Cl.
*H04L 29/06* (2006.01)

(52) U.S. Cl.
USPC ............................................ 713/171; 380/281

(58) Field of Classification Search
None
See application file for complete search history.

(56) References Cited

U.S. PATENT DOCUMENTS

| 7,822,205 B2 | 10/2010 | Ksontini et al. | |
| 2004/0086127 A1* | 5/2004 | Candelore | 380/281 |
| 2005/0044365 A1* | 2/2005 | Haukka et al. | 713/171 |
| 2005/0086175 A1* | 4/2005 | Brique et al. | 705/64 |
| 2006/0002561 A1 | 1/2006 | Choi et al. | |
| 2010/0217985 A1* | 8/2010 | Fahrny et al. | 713/169 |
| 2010/0262988 A1* | 10/2010 | Bauer et al. | 725/26 |

FOREIGN PATENT DOCUMENTS

| EP | 1089179 A1 | 4/2001 |
| KR | 10-2005-0057400 A | 6/2005 |
| KR | 20060002099 A | 1/2006 |

\* cited by examiner

*Primary Examiner* — David Pearson
(74) *Attorney, Agent, or Firm* — Rabin & Berdo, P.C.

(57) ABSTRACT

A downloadable conditional access system (DCAS), a secure micro (SM), and a transport processor (TP), and a security authentication method using the same are provided. The DCAS provides a safe security environment through a security protocol which enables mutual authentication and secure channel establishment between the SM and the TP.

15 Claims, 5 Drawing Sheets

DOWNLOADABLE CONDITIONAL ACCESS SYSTEM, SECURE MICRO, AND TRANSPORT PROCESSOR, AND SECURITY AUTHENTICATION METHOD USING THE SAME

CROSS REFERENCE TO RELATED APPLICATIONS

This application claims the benefit under 35 U.S.C. §119(a) of Korean Patent Application Nos. 10-2009-0022799, filed on Mar. 17, 2009, and 10-2009-0089104, filed on Sep. 21, 2009, the entire disclosures of which are incorporated herein by reference for all purposes.

BACKGROUND

1. Field

The following description relates to a security technology, and more particularly, to security protocol technology of a downloadable conditional access system.

2. Description of the Related Art

With the introduction of downloadable conditional access system (DCAS), cable service subscribers can purchase a set-top box from retailers regardless of multiple system operators (MSOs) from which the subscriber is provided with cable services. In addition, the DCAS enables subscribers to use pay-cable services continuously without need of replacing a set-top box even when changing from one MSO to another. Furthermore, the DCAS allows a subscriber to replace a conditional access system (CAS) with a new CAS manufactured by a different provider without replacing the existing set-top box.

The above advantages can be achieved by the DCAS which allows images of security-required application programs, such as a CAS application, a digital right management (DRM) application and an authorized service domain (ASD) application, to be safely downloaded to secure micro (SM) which is a security chip in the set-top box and also allows the MSO to freely install and replace such applications from sources online.

SUMMARY

In one general aspect, there is provided security protocol technology that ensures a safe security environment between a secure micro and a transport processor in a downloadable conditional access system.

In one general aspect, there is provided a method of security authentication between a secure micro (SM) and a transport processor (TP) in a downloadable conditional access system (DCAS), the method including: receiving, at the SM, a validation verification message which includes an encryption seed key for an identifier pair consisting of a secure micro (SM) identifier and a transport processor (TP) identifier; and generating, at the SM, a content key encryption key (CKEK) based on the encryption seed key, and encrypting data to be transmitted to the TP using the CKEK.

In another general aspect, there is provided a secure micro (SM) including: an SM pairing unit to encrypt and transmit to a headend a key request message which includes an identifier pair consisting of an SM identifier and a TP identifier, and to receive from the headend a key response message which includes an encryption seed key for the identifier pair; an SM key generating unit to generate a content key encryption key (CKEK) based on the encryption seed key and transmit the CKEK to the TP, and to receive a CKEK generated by the TP; and a SM encrypting unit to compare the received CKEK with the CKEK generated by the SM key generating unit, and to encrypt data to be transmitted to the TP when the CKEKs are identical to each other.

In yet another aspect, there is provided a transport processor (TP) including: a TP pairing unit to transmit a certification response message including certificate information of the TP to the SM when receiving a certification request message including certificate information of the SM, and to receive an encryption seed key for an identifier pair consisting of an SM identifier and a TP identifier from the SM; a TP key generating unit to generate a content key encryption key (CKEK) using the encryption seed key and transmit the generated CKEK to the SM; and a TP encrypting unit to share the transmitted CKEK with the SM when the transmitted CKEK is identical with a CKEK generated by the SM, and to encrypt data to be transmitted to the SM using the shared CKEK.

In another general aspect, there is provided a security apparatus for a set-top box of a downloadable conditional access system (DCAS), the security apparatus including: a secure micro (SM) to generate an SM content key encryption key (CKEK) based on a validation verification message including an encryption seed key for an identifier pair consisting of an SM identifier and a transport processor (TP) identifier, and to encrypt data to be transmitted to a transport processor (TP) using the SM CKEK; and the TP to receive the encryption seed key from the SM and generate a TP CKEK using the encryption seed key, and to encrypt data to be transmitted to the SM using the TP CKEK.

Other features and aspects will be apparent from the following detailed description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
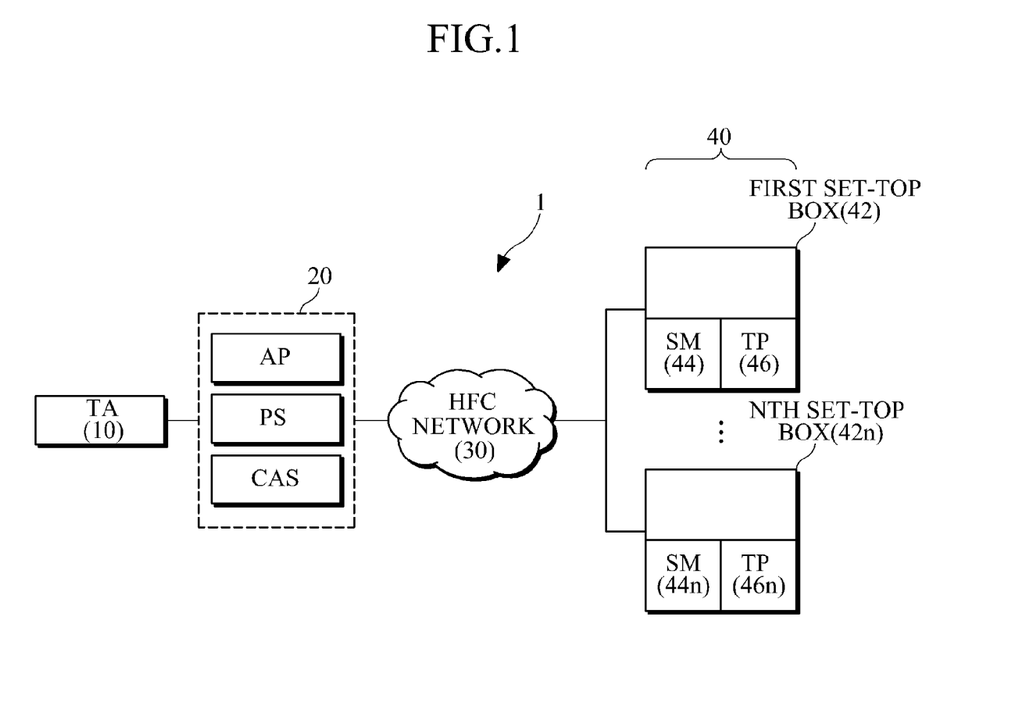
FIG. 1 is a diagram illustrating an example of a downloadable conditional access system (DCAS).

FIG. 1 illustrates an example of a downloadable conditional access system (DCAS) 1. Referring to FIG. 1, the DCAS 1 includes a trusted authority (TA) 10, a multiple system operator (MSO) 20, and a set-top box 40, which includes a secure micro 44 and a transport processor (TP) 46.

The DCAS 1 provides a pay-cable service not by installing an application to a smart card or a personal computer memory card international association (PCMCIA) card, but by embedding the secure micro 44 to which an application can be installed in the set-top box 40. Accordingly, a subscriber is allowed to use the pay-cable service without replacing the set-top box 40 even when an application is updated via a hybrid fiber coat (HFC) network 30 or the MSO 20 is changed.

In the example shown in FIG. 1, the MSO 20 acts as a headend device of the DCAS 1, and the set-top box 40 acts as a host device of the DCAS 1. Communication mechanism on security agreements and procedures for messages communicated between the headend device and the host device is defined as DCAS security protocol.

The TA 10 is an independent entity, and authenticates the SM 44 and the TP 46. In addition, the TA 10 initializes the SM 44 and the TP 46. In one example, a local key server (LKS) may substitute for the TA 10 according to the configuration and operation policies of the DCAS 1.

The MSO 20 includes an authentication proxy (AP), a personalization server (PS), and a conditional access system (CAS). The AP acts as an agent for the TA 10, and the PS manages an image of an application to be transmitted to the set-top box 40.

The SM 44 included in the set-top box 40 is a security chip, and stores and runs applications including a conditional access (CA) application, a digital right management (DRM) application, and an authorized service domain (ASD) application. In addition, the SM 44 stores and manages paid-service usage authorization information. The TP 46 is a descrambler chip, and restores original broadcasting information by descrambling broadcasting information received from the MSO 20.

One of the most important security requirements for the DCAS 1 is security authentication between the SM 44 and the TP 46. This requirement is referred to as pairing between the SM 44 and the TP 46. If the pairing is not performed properly, it may cause serious control word (CW) hacking problem. For example, a hacked TP 46 may intercept a CW transferred from the SM 44 through impersonation attack. Then, a hacker is possible to view paid-broadcasting without authentication, using the stolen CW.

Moreover, when the pairing is not performed properly, there may occur a problem of managing paid-viewers. For example, a hacker may remove the SM 44 from one set-top box which stores paid-service usage authorization information, and connects the removed SM 44 to another set-top box which is unauthorized to use the paid-service, and then may view paid broadcasting using the unauthorized set-top box. As the result, the MSO 20 is impossible to manage paid subscribers appropriately, resulting in business losses.

To prevent the above drawbacks, a security protocol is introduced, which may resolve a problem of mutual authentication and security channel establishment between the SM 44 and the TP 46. Using the security protocol, safe security between the SM 44 and the TP 46 is provided, and thus it is prevented that a user illegally connects an SM to a TP of a different set-top box or a hacked TP maliciously intercepts security information from the SM.

Figure 2:
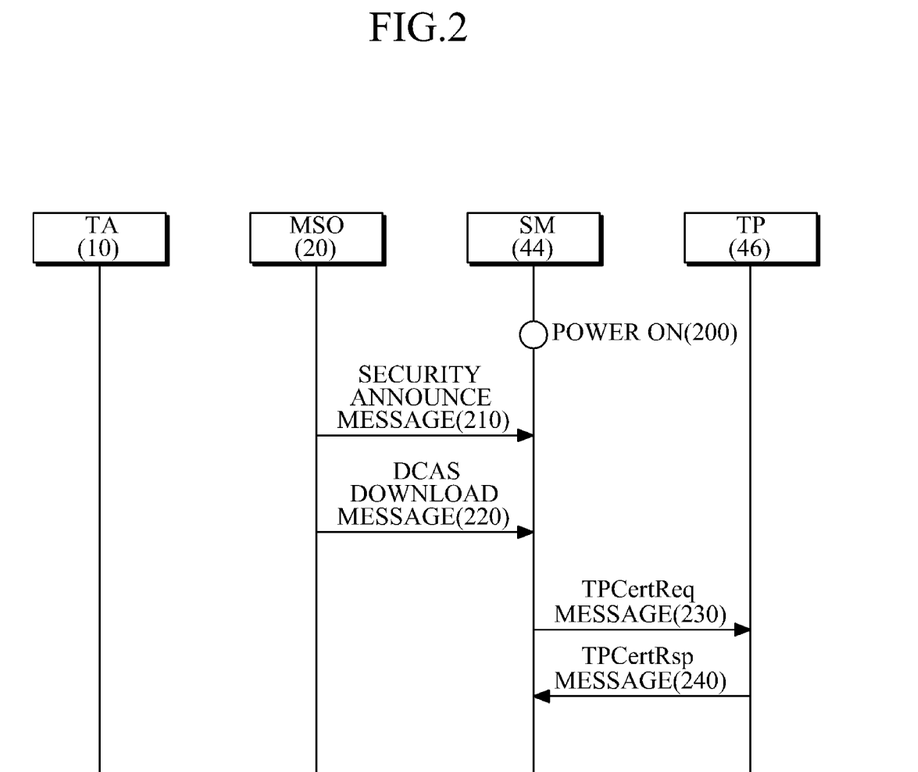
FIG. 2 is a flowchart illustrating an example of initialization for security authentication between a secure micro and a transport processor.
Figure 3:
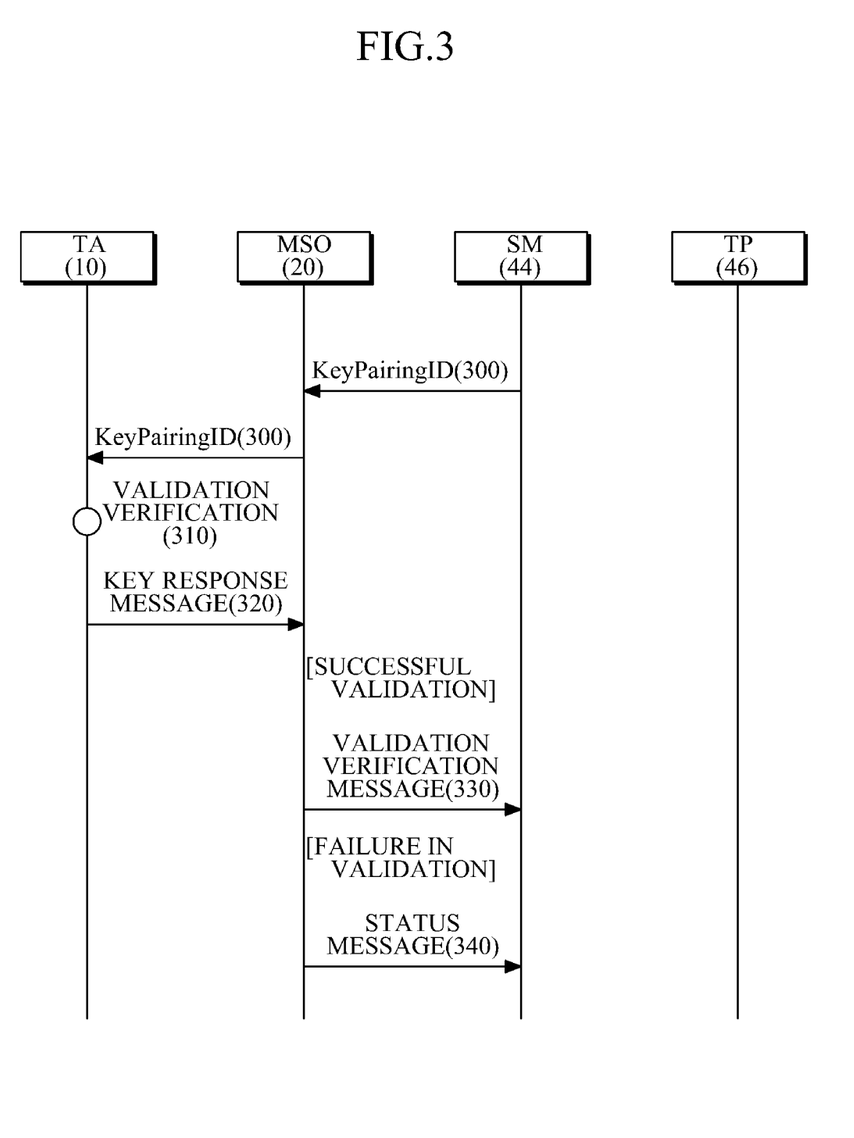
FIG. 3 is a flowchart illustrating an example of a method of pairing an SM and a TP for security authentication therebetween.
Figure 4:
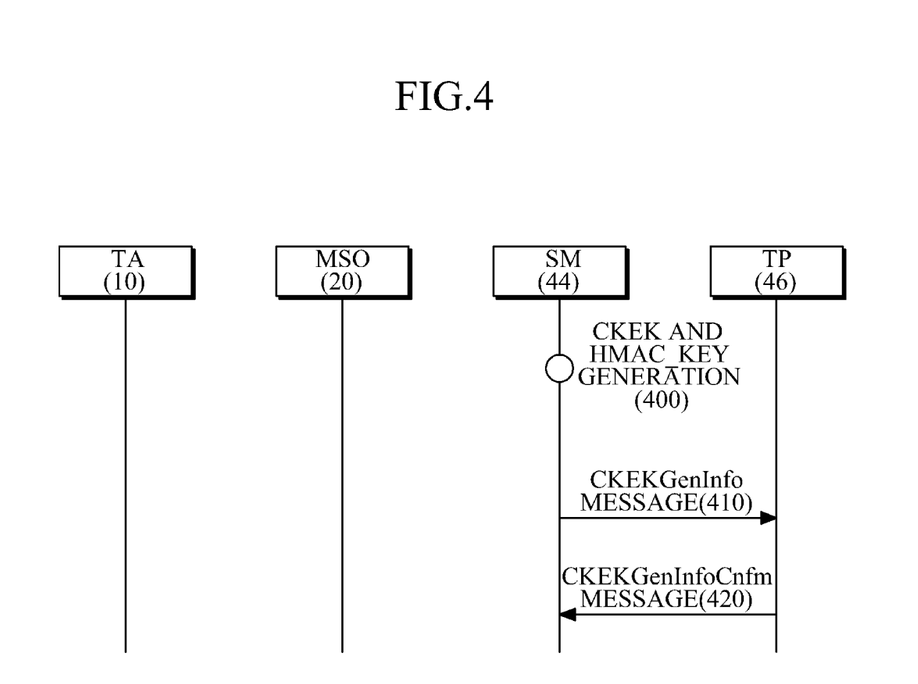
FIG. 4 is a flowchart illustrating an example of a key generation method for security authentication between an SM and a TP.

FIGS. 2 to 4 illustrate flowcharts that illustrate an example of a method of security authentication between an SM 44 and a TP 46.

Referring to FIGS. 2 to 4, the security authentication method using a security protocol between the SM 44 and the TP 46 includes initialization, pairing, and key generation. A local key server (LKS) may substitute for a TA 10. A headend device includes the TA and an MSO 20, and a set-top box as a host device includes the SM 44 and the TP 46.

At the initialization, the security protocol between the SM 44 and the TP 46 is initiated. At the pairing, when the SM 44 transmits identification information of itself and the TP 46 to the headend device, the headend device verifies validation of the identification information. If the identification information of the SM 44 and the TP 46 are validated, the SM 44 and the TP 46 are managed in pair. Then, the headend device transmits a validation verification message containing encryption seed key to the SM 44.

At the key generation, the SM 44 and the TP 46 generate content key encryption keys (CKEKs) and encrypts mutual traffics with the generated CKEKs. If the SM 44 is paired with the TP 46, a CKEK of the SM 44 is the same as a CKEK of the TP 46. Hereinafter, each procedure of the security authentication method using the security protocol will be described in detail.

FIG. 2 illustrates a flowchart of an example of initialization for security authentication between the SM 44 and the TP 46.

Referring to FIG. 2, a security protocol between the SM 44 and the TP is initiated if preset initialization conditions are satisfied. Here, the initialization may be conducted when the SM 44 is newly booted due to newly supplied power or due to the reset at 200, when the SM 44 in a virgin state receives a security announce message from the AP 20 at 210, or when the SM 44 in a non-virgin state receives a client update request from the AP 20 through a DCAS download message at 220. The client may be a CAS client, a DRM client, or an ASD client, and the possible type of client is not limited thereto.

When any of the initialization conditions is satisfied, the SM 44 generates a certification request message (hereinafter referred to as TPCertReq message) including certificate information (X.509 CERTIFICATE_SM) of the SM 44 and transmits the TPCertReq message to the TP 46 at 230. In response to the receipt of the TPCertReq message from the SM 44, the TP 46 verifies certificate signature using a TA root certificate. If the verification is successful, the TP 46 stores the certificate information of the SM 44 in a non-volatile memory of the TP 46.

Then, the TP 46 generates a certification response message (hereinafter referred to as TPCertRsp message) and transmits the TPCertRsp message to the SM 44 at 240. Then, in response to the receipt of the TPCertRsp message, the SM 44 verifies a certificate signature using the TA root certificate. If the verification is successful, the SM 44 stores certificate information (X.509 CERTIFICATE_TP) of the TP 46, which is included in the TPCertRsp message, in a non-volatile memory of the SM 44.

FIG. 3 illustrates a flowchart of an example of a method of pairing an SM 44 and a TP 46 for security authentication. Referring to FIG. 3, the SM 44 transmits SM identifier (SM_ID) and TP identifier (TP_ID) to an AP 20, and a TA 10 verifies the validation of the respective identification information. In detail, the SM 44 encrypts a key request message including a pair of identifiers (hereinafter referred to as KeyPairingID) of the SM 44 and the TP 46, and transmits the KeyPairingID to the TA 10 via the AP 20 at 300. The KeyPairingID is a concatenated value of the SM identifier and the TP identifier. For example, the KeyPairingID may be a concatenated value of an SM_ID of 40 bytes and a TP_ID of 4 bytes. The KeyPairingID may be obtained by equation 1 below:

$$KeyPairingID=SM\_ID\backslash\backslash TP\_ID \quad (1)$$

The TA 10 which has received the key request message verifies the validation of the KeyPairingID at 310. For example, for the validation verification, the TA 10 may compare originally issued identifier (ID) values of the SM 44 and the TP 46 with ID values of the SM 44 and the TP 46 which are received through the key request message. Only when the originally issued ID values are identical with the ID values received through the key request message, the TA 10 verifies that the KeyPairingID is validated.

The TA 10 generates a key response message based on the validation verification result of the KeyPairngID at 320. If the KeyPairingID is validated, the TA 10 generates a key pairing key (KPK) that is a seed encryption key, and transmits a validation verification message that indicating the validation of the KeyPairingID to the SM 44 via the AP 20 at 330. If the KeyPairingID is invalid, the TA 10 transmits, at 340, a status message for indicating that the KeyPairingID is invalid, for example, a status message that sets all bytes of the KPK to '0xff', to the SM 44 via the AP 20.

For example, the KPK may be 160 bits in length and be formed by equation 2 below:

$$KPK=PRF(H(Ki_1\backslash\backslash Ki_2\backslash\backslash Ki_3\backslash\backslash SM\_ID\backslash\backslash TP\_ID\backslash\backslash RAND_{KPK}))_{msb(1-160)} \quad (2)$$

where H(m) represents SHA1 value with respect to a message "m", and PRF(X)msb(Y) represents Y bits starting from the most significant bit (MSB) of the PRF resultant value obtained by applying a pseudo random function to X as a seed value of PRF.

FIG. 4 illustrates a flowchart of an example of a key generation method for security authentication between an SM 44 and a TP 46. Referring to FIG. 4, a content key encryption key (CKEK) for encrypting traffics between the SM 44 and the 46 is generated. Since the CKEK is generated using the above-described KPK, the SM 44 and the TP 46 are possible to generate the same CKEKs only when the pairing of the SM 44 and the TP 46 is normally performed. The CKEK may be formed by equation 3 below:

$$CKEK=(KPK\backslash\backslash SM\_ID\backslash\backslash TP\_ID)_{msb(1-128)} \quad (3)$$

It is noted that the CKEK may be formed using sequentially the first to $128^{th}$ bits starting from the most significant bit (MSB) of a concatenated value of the KPK, the SM identifier and the TP identifier.

More specifically, in response to the receipt of the validation verification message from the AP 20, the SM 44 generates the CKEK and a hashed message authentication code key (hereinafter referred to as HMAC_KEY) at 400. Then, the SM 44 generates a CKEK message (hereinafter referred to as CKEKGenInfo message) and transmits the generated CKEKGenInfo message to the TP 46 at 410. The CKEKGenInfo message is encrypted with a public key of the TP 46, and electronically signed with a private key of the SM 44. Alternatively, if the SM 44 receives a key response message that indicates the failure of the validation from the AP 20, for example, a key response message which has all bytes of the KPK set to '0xff', the SM 44 transmits to the TP 46 a CKEKGenInfo message that includes the KPK having all bytes set to '0xff' at 410.

In one example, the HMAC_KEY of the SM 44 is obtained by applying SHA1 to a concatenated value of the SM_ID, the TP_ID and a random number produced by a RAND function, and may be obtained by equation 4 below:

$$HMAC\_KEY=H(RAND_{HMAC}\backslash\backslash SM\_ID\backslash\backslash TP\_ID) \quad (4)$$

In response to the receipt of the KPK and HMAC_KEY through the CKEK message from the SM 44, the TP 46 generates a CKEK. The CKEK generated by the TP 46 is the same as the CKEK generated by the SM 44 if the TP 46 has been paired with the SM 44.

Then, the TP 46 transmits a CKEK confirmation message (hereinafter referred to as CKEKGenInfoCnfm message) including the generated CKEK and the HMAC_KEY to the SM 44 at 420. If all bytes of the KPK received from the SM 44 are set as '0xff', the TP 46 terminates the security protocol. The CKEKGenInfoCnfm message is encrypted with a public key of the SM 44 and electronically signed with a private key of the TP 46.

Subsequently, in response to the receipt of the CKEKGenInfoCnfm message, the SM 44 checks whether the CKEK generated by the SM 44 and the HMAC_KEY are the same as those included in the CKEKGenInfoCnfm message. If the CKEK and the HMAC_KEY of the SM 44 are identical with those included in the CKEKGenInfoCnfm message, the SM 44 shares the CKEK and the HMAC_KEY with the TP 46. Then, the SM 44 encrypts a control word, an ADS content key, and the DRAM content key with the CKEK, and transmits them to the TP 46.

The encryption may be performed on DCAS layer data unit (DLDU) content field of a message, and HMAC authentication may be performed on both an adaptive layer data unit (ALDU) header field and the DLDU content field. RSA encryption and RSA electronic signature verification may be performed on the DLDU content field of the CKEK message. For example, the RSA encryption may be performed using RSAES_OAEP scheme, and RSA electronic signature verification may be performed using RSASSA-PSS scheme, and the applicable scheme for the RSA electronic signature verification is not limited thereto.

Figure 5:
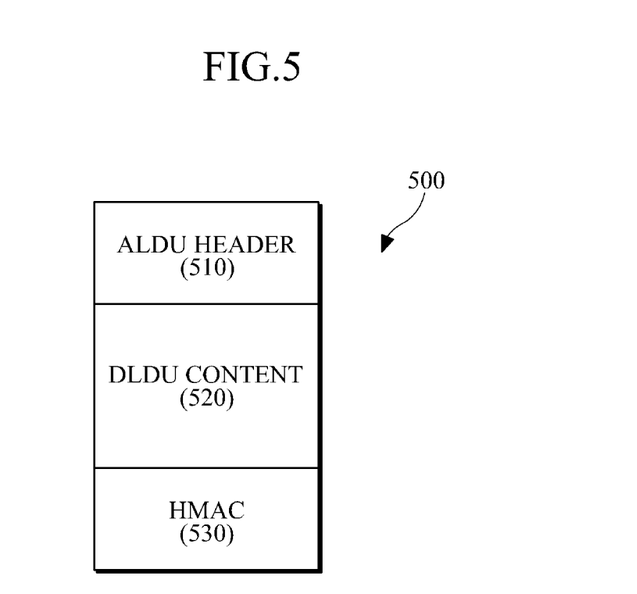
FIG. 5 is a diagram illustrating an example of a message to be transmitted to a security protocol.

FIG. 5 illustrates an example of a configuration of a message 500 to be transmitted to a security protocol. Referring to FIG. 5, the message 500 to be transmitted to a security protocol includes an ALDU header field 510, a DLDU content field 520, and a hashed message authentication code (HMAC) field 530.

Advanced encryption standard (AES) encryption and HMAC authentication are performed on all messages described with reference to FIGS. 2 to 4, except the TPCertReq message at 230, the TPCertRsp message at 240, and the CKEKGenInfo message at 410.

In detail, the SM 44 and the TP 46 perform AES encryption selectively on such important fields as a control word in the DLDU content 520 using the CKEK as an encryption key. The SM 44 and the TP 46 encrypt data to be transmitted to each other using the CKEK. For example, advanced encryption standard 128 electric code block (AES 128 ECB) scheme may be used for the encryption. AES 128 ECB scheme encrypts elements of a message, which requires encryption and is communicated between the SM 44 and the TP 46, using the CKEK as an encryption key. For HMAC authentication, a 160-bit value produced by HMAC-SHA1 scheme with respect to the ALDU header 510 and the DLDU content 520 is concatenated with the DLDU content 520.

Figure 6:
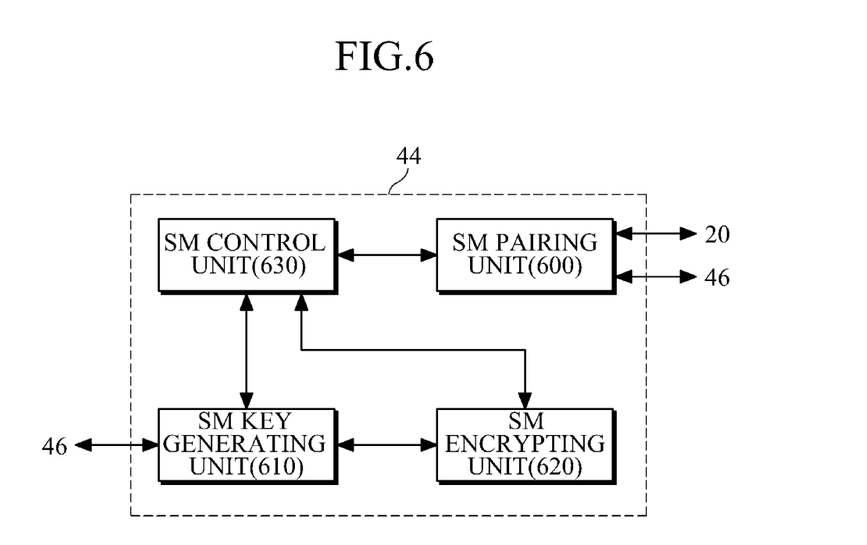
FIG. 6 is a diagram illustrating an example of an SM.

FIG. 6 illustrates an example of a secure micro (SM) 44. Referring to FIG. 6, the SM 44 includes an SM pairing unit 600, an SM key generating unit 610, an SM encrypting unit 620, and an SM control unit 630.

When a preset initialization condition is satisfied, The SM pairing unit 600 transmits to the TP 46 a certification request message (hereinafter referred to as TPCertReq message) including the certificate information (X.509 CERTIFICATE_SM) of the SM 44, and receives a certification response message (TPCertRsp message) including the certificate information (X.509 CERTIFICATE_TP) of the TP 46 from the TP 46.

In response to the receipt of the TPCertRsp message, the SM pairing unit 600 encrypts a key request message including an identifier pair consisting of an SM identifier (SM_ID) and a TP identifier (TP_ID), and transmits the encrypted key request message to a headend. In response, the SM pairing unit 600 receives a key response message including a KPK which is a seed key for the identifier pair from the headend. The KPK produces a pseudo random number sequence using a KeyPairingID value, which is obtained by concatenating the SM_ID and the TP_ID, as a seed value when the KeyPairingID value is validated.

According to the result of verifying validation of the KeyPairingID value by the headend, the key response message to be received by the SM 44 includes the KPK when the KeyPairingID is validated, and values of all bytes of the KPK included in the key response message are set to '0xff' when the KeyPairingID is invalid.

The SM key generating unit 610 generates a CKEK message (CKEKGenInfo message), which includes a CKEK and an HMAC_KEY, based on the KPK, and transmits the generated CKEKGenInfo message to the TP 46. The CKEKGenInfo message may be encrypted with a public key of the TP 46 and electronically signed with a private key of the SM 44.

The CKEK may be formed using sequentially the first to $128^{th}$ bits starting from the most significant bit (MSB) of a concatenated value of the KPK, the SM identifier (SM_ID) and the TP identifier (TP_ID). The HMAC_KEY may be obtained by applying SHA1 to a concatenated value of the SM_ID, the TP_ID and a random number produced by a RAND function.

Thereafter, when the TP 46 generates a CKEK and an HMAC_KEY, the SM key generating unit 610 receives a CKEK confirmation message (hereinafter, referred to as CKEKGenInfoCnfm message) including the generated CKEK and HMAC_KEY from the TP 46. The CKEKGenInfoCnfm message may be encrypted with a public key of the SM 44 and electronically signed with a private key of the TP 46. When the values of all 20 bytes of the KPK transmitted from the SM 44 are set as '0xff', the TP 46 terminates the security protocol.

When the SM key generating unit 610 receives the CKEKGenInfoCnfm message, the SM encrypting unit 620 checks whether the CKEK and the HMAC_KEY which are included in the CKEKGenInfoCnfm message are identical with the CKEK and the HMAC_KEY which are generated by the SM key generating unit 610. If the CKEK and the HMAC_KEY are same as those of the CKEKGenInfoCnfm, the SM 44 shares the generated CKEK and the HMAC_KEY with the TP 46, and the SM encrypting unit 620 encrypts a control word, an ADS content key, and a DRM content key using the CKEK, and transmits the encrypted control word and keys to the TP 44.

The SM control unit 630 controls the SM pairing unit 600, the SM key generating unit 610, and the SM encrypting unit 620.

Figure 7:
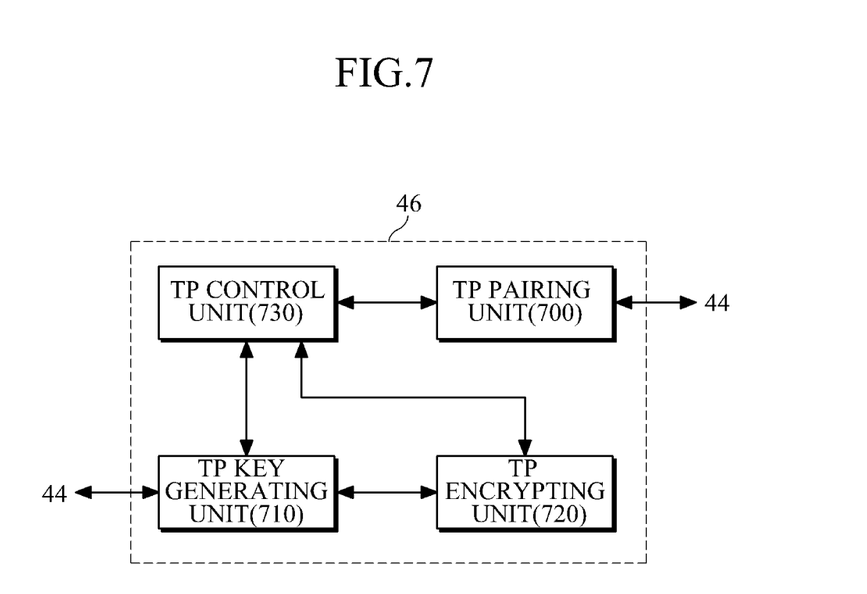
FIG. 7 is a diagram illustrating an example of a TP.

FIG. 7 illustrates an example of a TP 46. Referring to FIG. 7, the TP 46 includes a TP pairing unit 700, a TP key generating unit 710, a TP encrypting unit 720, and a TP control unit 730.

The TP pairing unit 700 receives a TPCertReq message including X.509 CERTIFICATE_SM of the SM 44, and transmits a TPCertRsp including X.509 CERTIFICATE_TP of the TP 46 to the SM 44.

When a headend verifies the validation of a KeyPairingID which is an identifier pair consisting of an SM identifier and a TP identifier and is received from the SM 44, the TP pairing unit 700 receives a CKEKGenInfo message including a KPK and an HMAC_KEY for the KeyPairingID from the SM 44. The KPK produces a pseudo random number sequence using a KeyPairingID value as a seed value when the KeyPairingID value is validated.

The TP key generating unit 710 generates a CKEK using the KPK and the HMAC_KEY of the received CKEKGenInfo message. Then, the TP key generating unit 710 transmits a CKEKGenInfoCnfm message including the generated CKEK and HMAC_KEY to the SM 44. If all bytes of the KPK received from the SM 44 are set as '0xff', the TP key generating unit 710 terminates the security protocol. The CKEKGenInfoCnfm message may be encrypted with a public key of the SM 44 and electronically signed with a private key of the TP 46.

The CKEK may be formed using sequentially the first to $128^{th}$ bits starting from the most significant bit (MSB) of a concatenated value of the KPK, the SM identifier and the TP identifier. The HMAC_KEY generated by the SM 44 may be obtained by applying SHA1 to a concatenated value of the SM_ID, the TP_ID and a random number produced by a RAND function.

The TP encrypting unit 720 shares the CKEK and the HMAC_KEY, which are transmitted through the CKEKGenInfoCnfm message to the SM 44, with the SM 44 if the transmitted CKEK and HMAC_KEY are identical with those of the SM 44. In addition, the TP encrypting unit 720 encrypts data to be transmitted to the SM 44, and performs hashed message authentication on a message to be transmitted.

The TP control unit 730 controls the TP pairing unit 700, the TP key generating unit 710, and the TP encrypting unit 720.

Accordingly, a safe security environment can be configured since the SM 44 and TP 46 can authenticate each other and a security channel therebetween can be established when using the security protocol between the SM 44 and the TP 46 according to the above exemplary embodiments. In addition, malicious attacks to the SM 44 and the TP 46 can be prevented. For example, an attempt of a hacker to connect the SM 44 illegally with a TP in a different set-top box or an attempt of a hacked TP to intercept security information of the SM 44 may be prevented. Furthermore, integrity of an application implemented on the SM 44 is verified based on the security authentication between the SM 44 and the TP 46, and thus the security of the application can be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of security authentication between a secure micro (SM) and a transport processor (TP) in a downloadable conditional access system (DCAS), the method comprising:

receiving, at the SM, a validation verification message which includes an encryption seed key for an identifier pair consisting of a secure micro (SM) identifier and a transport processor (TP) identifier; and generating, at the SM, a content key encryption key (CKEK) and a hashed message authentication code key (HMAC_KEY) based on the encryption seed key, and encrypting data to be transmitted to the TP through the CKEK and the HMAC_KEY authentication between the SM and the TP using the encryption seed key, wherein the encrypting of the data to be transmitted to the TP includes generating the CKEK and the HMAC_KEY and transmitting a message including the encryption seed key to the TP, receiving a CKEK and an HMAC_KEY which are generated by the TP using the encryption seed key, and comparing the received CKEK and the HMAC_KEY, respectively, with the CKEK and the HMAC_KEY of the SM, encrypting the data to be transmitted to the TP and performing hashed message authentication on a message to be transmitted to the TP if the CKEKs and the HMAC_KEYs are identical, respectively, to each other.

2. The method of claim 1, wherein the encryption seed key is a key pairing key (KPK) which produces a random number sequence using a key pairing identifier value as a seed value when the key pairing identifier value is validated where the key pairing identifier value is obtained by concatenating the SM identifier and the TP identifier.

3. The method of claim 1, wherein the CKEK is generated using a concatenated value of the encryption seed key, the SM identifier and the TP identifier.

4. The method of claim 1, wherein the identifier pair is a key pairing identifier that is produced by concatenating the SM identifier and the TP identifier.

5. The method of claim 1, wherein the CKEK generated by the SM is identical with a CKEK that is generated by the TP which is paired with the SM.

6. The method of claim 1, wherein the receiving of the validation verification message includes encrypting and transmitting a key request message including the identifier pair comprising of the secure micro identifier and the transport processor identifier to a headend, and receiving the validation verification message from the headend where the validation verification message is a key response message with respect to the key request message.

7. The method of claim 1, wherein the HMAC_KEY is obtained by applying SHA1 to a concatenated value of the SM identifier, the TP identifier and a random number produced by a RAND function.

8. The method of claim 1, wherein the encrypting of the data is performed on a DCAS layer data unit (DLDU) content field of the message to be transmitted to the TP, and the hashed message authentication is performed on the DLDU content field and an adaptive layer data unit (ALDU) of the message.

9. The method of claim 1, wherein the encrypting of the data to be transmitted to the TP encrypts the data using a symmetric-key encryption algorithm.

10. The method of claim 1, further comprising:
initializing the SM and the TP for secure authentication therebetween.

11. The method of claim 10, wherein the initializing of the SM and the TP includes transmitting a certification request message including certificate information of the SM to the TP when a preset initialization condition is satisfied, and receiving a certification response message including certificate information of the TP from the TP.

12. The method of claim 11, wherein the preset initialization condition is satisfied when the SM is booted due to reset or supply of power to the SM, when the SM receives security announce message from the headend, or when the SM receives a client update request through a download message from the headend.

13. A secure micro (SM) for performing security authentication with respect to a transport processor (TP) in a downloadable conditional access system (DCAS), the secure micro comprising:

an SM pairing unit to encrypt and transmit to a headend a key request message which includes an identifier pair consisting of an SM identifier and a TP identifier, and to receive from the headend a key response message which includes an encryption seed key for the identifier pair;

an SM key generating unit to generate a content key encryption key (CKEK) and a hashed message authentication code key (HMAC_KEY) based on the encryption seed key and transmit the CKEK to the TP, and to receive a CKEK and an HMAC_KEY generated by the TP; and a SM encrypting unit to compare the received CKEK and HMAC_KEY with the CKEK and the HMAC_KEY generated by the SM key generating unit, and to encrypt data to be transmitted to the TP when the CKEKs are identical to each other, wherein the encrypting of the data to be transmitted to the TP includes generating the CKEK and the HMAC_KEY and transmitting a message including the encryption seed key to the TP, receiving a CKEK and an HMAC_KEY which are generated by the TP using the encryption seed key, and comparing the received CKEK and the HMAC_KEY, respectively, with the CKEK and the HMAC_KEY of the SM, encrypting the data to be transmitted to the TP and performing hashed message authentication on a message to be transmitted to the TP if the CKEKs and the HMAC_KEYs are identical, respectively, to each other.

14. The SM of claim 13, wherein the encryption seed key is a key pairing key (KPK) which produces a random number sequence using a key pairing identifier value as a seed value when the key pairing identifier value is validated where the key pairing identifier value is obtained by concatenating the SM identifier and the TP identifier.

15. The SM of claim 13, wherein the CKEK is generated using a concatenated value of the encryption seed key, the SM identifier and the TP identifier.

* * * * *